2,759,931
Patented Aug. 21, 1956

2,759,931

METHOD FOR THE PREPARATION OF N-(5-NITRO-2-FURFURYLIDENE)-3-AMINO-2-OXAZOLIDONE

Gordon D. Drake, Norwich, Gabriel Gever, Oxford, and Kenyon J. Hayes, Norwich, N. Y., assignors, by mesne assignments, to The Norwich Pharmacal Company, Norwich, N. Y., a corporation of New York No Drawing. Application August 10, 1953,
Serial No. 373,437

2 Claims. (Cl. 260—240)

This invention relates to an improved method for the preparation of N - (5-nitro-2-furfurylidene)-3-amino-2-oxazolidone, a highly effective chemotherapeutic agent in the treatment of microbial infections.

Various methods for preparing N-(5-nitro-2-furfurylidene)-3-amino-2-oxazolidone and related compounds have been set forth in pending applications Serial Nos. 274,066 and 274,067, filed February 28, 1952, upon which U. S. Patents Nos. 2,749,462 and 2,652,402 have issued, respectively, and owned by the assignee of this application. One of the methods revealed in the aforementioned applications depends upon the reaction of a hydrazinoalcohol with an alkyl carbonate, preferably diethyl carbonate, in the presence of an alkaline metal catalyst, preferably sodium methylate, to yield 3-amino-2-oxazolidone or a substituted 3-amino-2-oxazolidone which, upon condensation with 5-nitro-2-furaldehyde or a suitable derivative thereof, produces the desired N-(5-nitro-2-furfurylidene)-3-amino-2-oxazolidone.

We have discovered that a considerable improvement in over-all yield of the desired product, N-(5-nitro-2-furfurylidene)-3-amino-2-oxazolidone can be effected if N-(benzylidene)-3-amino-2-oxazolidone prepared in accordance with the method described in our co-pending application Serial No. 374,146, filed August 15, 1953, upon which U. S. Patent No. 2,740,792 has issued, is reacted with 5-nitro-2-furaldehyde or suitable derivative thereof in aqueous mineral acid, e. g., sulfuric acid. The reaction scheme may be represented by the equation set forth below:

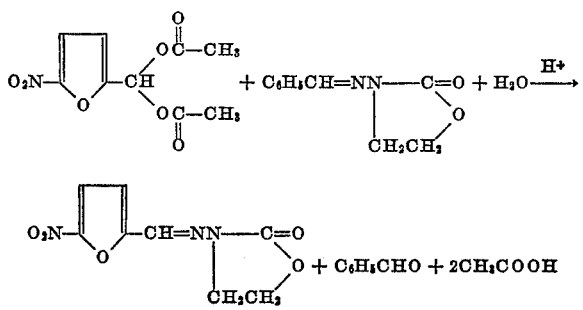

The reaction depicted by the equation above, wherein N-(benzylidene)-3-amino-2-oxazolidone is caused to react with 5-nitro-2-furaldehyde diacetate in an aqueous mineral acid medium such as dilute sulfuric acid, is carried out in such a fashion that the hydrolysis of benzaldehyde, the steam distillation thereof and the hydrolysis of 5-nitro-2-furaldehyde diacetate to give up the free aldehyde permitting condensation in the reaction medium with 3-amino-2-oxazolidone resulting from the hydrolysis of N-(benzylidene)-3-amino-2-oxazolidone to yield the desired N - (5 - nitro-2-furfurylidene)-3-amino-2 - oxazolidone are simultaneously effected. The yield of the N - (5 - nitro-2-furfurylidene)-3-amino-2-oxazolidone is about 92%.

In order that this invention may be fully available to those skilled in the art, the following illustrative example is given:

EXAMPLE

*Preparation of N - (5-nitro-2-furfurylidene)-3-amino-2-oxazolidone*

In 212 cc. of water are mixed 21.2 grams (0.112 mols) of N-(benzylidene)-3-amino-2-oxazolidone, 8.93 grams of concentrated sulfuric acid, and 30.1 grams (0.124 mols) of 5-nitro-2-furaldehyde diacetate. This mixture is heated to effect the hydrolysis of N-(benzylidene)-3-amino-2-oxazolidone, steam distillation of the benzaldehyde and hydrolysis of 5-nitro-2-furaldehyde diacetate. Approximately 1½ hours are required for this reaction to take place. When the bulk of the benzaldehyde has been removed, 50 cc. of 99% isopropanol are added, the reaction mixture is refluxed a short time, and the crystals of N-(5-nitro-2-furfurylidene)-3-amino-2-oxazolidone are filtered from the hot suspension. The product is washed with water and isopropanol and dried; a yield of 23.3 grams, 92.8% based on N-(benzylidene)-3-amino-2-oxazolidone of M. P. 254–256° C. is obtained.

What is claimed is:

1. The method of preparing N-(5-nitro-2-furfurylidene)-3-amino-2-oxazolidone, which comprises hydrolyzing-5-nitro-2-furaldehyde diacetate to produce 5-nitro-2-furaldehyde and causing N-(benzylidene)-3-amino-2-oxazolidone to react with said 5-nitro-2-furaldehyde in the presence of a dilute mineral acid and under the influence of heat.

2. The method of preparing N-(5-nitro-2-furfuryl-idene)-3-amino-2-oxazolidone, which comprises mixing N - (benzylidene)-3-amino-2-oxazolidone with 5-nitro-2-furaldehyde diacetate and sulfuric acid in water, and applying heat to said mixture to effect the simultaneous hydrolysis of N - (benzylidene) - 3-amino-2-oxazolidone, steam distillation of benzaldehyde, and hydrolysis of 5-nitro-2-furaldehyde diacetate to liberate free aldehyde and effect condensation in the reaction medium with 3-amino-2-oxazolidone resulting from the hydrolysis of said N-(benzylidene)-3-amino-2-oxazolidone.

No references cited.